US011356967B2

(12) United States Patent
Chen et al.

(10) Patent No.: US 11,356,967 B2
(45) Date of Patent: Jun. 7, 2022

(54) STANDALONE SSS FOR RRM AND CHANNEL ESTIMATION ENHANCEMENT

(71) Applicant: MediaTek Singapore Pte. Ltd., Singapore (SG)

(72) Inventors: Tao Chen, Beijing (CN); Wei-De Wu, Hsinchu (TW); Min Lei, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/964,767

(22) PCT Filed: Aug. 2, 2019

(86) PCT No.: PCT/CN2019/099083
§ 371 (c)(1),
(2) Date: Jul. 24, 2020

(87) PCT Pub. No.: WO2020/025060
PCT Pub. Date: Feb. 6, 2020

(65) Prior Publication Data
US 2021/0167884 A1 Jun. 3, 2021

(51) Int. Cl.
*H04J 11/00* (2006.01)
*H04W 24/10* (2009.01)
(Continued)

(52) U.S. Cl.
CPC ........ *H04W 56/001* (2013.01); *H04J 11/0076* (2013.01); *H04J 11/0083* (2013.01);
(Continued)

(58) Field of Classification Search
CPC ... H04B 7/02–14; H04B 17/0082–3913; H04J 11/0023–0093;
(Continued)

(56) References Cited

U.S. PATENT DOCUMENTS

2017/0181065 A1\* 6/2017 Svedman ............ H04W 56/001
2018/0198659 A1 7/2018 Ko et al.
(Continued)

FOREIGN PATENT DOCUMENTS

CN 105453455 A 3/2016
CN 108023695 A 5/2018
WO WO 2018/075985 A1 4/2018

OTHER PUBLICATIONS

Combined Taiwanese Office Action and Search Report dated May 10, 2021 in Taiwanese Patent Application No. 109118382 (with Engiish translation of Category of Cited Documents), 11 pages.
(Continued)

*Primary Examiner* — Timothy J Weidner
(74) *Attorney, Agent, or Firm* — Oblon, McClelland, Maier & Neustadt, L.L.P.

(57) ABSTRACT

A method based on standalone secondary synchronization signals (SSSs) can include receiving a configuration of an SSS burst at a user equipment (UE) from a base station in a wireless communication network. The SSS burst can include standalone SSSs grouped into SSS sets. Each SSS set can be associated with a beam index. The configuration can indicate frequency and timing locations of the standalone SSSs. The method can further include performing pre-synchronization, radio resource management (RRM) measurement, or cell detection based on the standalone SSSs in the SSS burst.

19 Claims, 12 Drawing Sheets

(51) Int. Cl.
*H04W 52/52* (2009.01)
*H04W 56/00* (2009.01)
*H04W 72/04* (2009.01)
*H04W 84/04* (2009.01)
*H04W 88/02* (2009.01)
*H04W 88/08* (2009.01)
*H04W 92/02* (2009.01)
*H04W 92/10* (2009.01)

(52) U.S. Cl.
CPC .......... *H04W 24/10* (2013.01); *H04W 52/52* (2013.01); *H04W 72/042* (2013.01); *H04W 72/046* (2013.01); *H04W 72/0446* (2013.01); *H04W 72/0453* (2013.01); *H04W 84/042* (2013.01); *H04W 88/02* (2013.01); *H04W 88/08* (2013.01); *H04W 92/02* (2013.01); *H04W 92/10* (2013.01)

(58) Field of Classification Search
CPC .. H04J 2011/0003–0096; H04L 5/0001–0098; H04W 8/22–245; H04W 24/02–10; H04W 36/0005–385; H04W 48/02–20; H04W 52/52; H04W 56/0005–0095; H04W 72/005–14; H04W 74/002–0891; H04W 76/10–50; H04W 84/005–16; H04W 88/005–12; H04W 92/02; H04W 92/04; H04W 92/10

See application file for complete search history.

(56) References Cited

U.S. PATENT DOCUMENTS

2019/0364523 A1* 11/2019 Wei .................... H04W 56/001
2020/0229113 A1*  7/2020 Yoon ................. H04W 56/0015

OTHER PUBLICATIONS

Combined Chinese Office Action and Search Report dated Dec. 3, 2021 in corresponding Chinese Patent Application No. 201980007943.8 (with English Translation of Category of Cited Documents), 9 pages.

Ericsson, "Design of Discovery Bursts and Procedures", 3GPP TSG RAN WG1 Meeting #76bis, R1-141642, 2014, 10 pages.

MediaTek Inc., "Considerations on NR RRM Power Saving with Additional Resource", 3GPP TSG RAN WG1 Meeting RAN1 #95, 2018, 10 pages.

* cited by examiner

STANDALONE SSS FOR RRM AND CHANNEL ESTIMATION ENHANCEMENT

CROSS REFERENCE TO RELATED PATENT APPLICATION(S)

This present disclosure claims the benefit of International Application No. PCT/CN2018/098323, "Standalone SSS for RRM and Channel Estimation Enhancement" filed on Aug. 2, 2018, which is incorporated herein by reference in its entirety.

TECHNICAL FIELD

The present disclosure relates to wireless communications, and specifically relates to downlink reference signals for enhancing radio resource management (RRM) measurement, channel estimation, and cell search.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Periodically transmitted synchronization signal (SS) blocks are introduced into the fifth generation (5G) New Radio (NR) air interface to facilitate cell search procedure. The SS blocks can also be used to obtain secondary synchronization signal (SSS) based reference signal received power (RSRP) measurements. In addition, pre-synchronization for data reception (e.g., paging reception at user equipment (UE) in radio resource control (RRC) idle mode) can also rely on signals of the SS blocks.

SUMMARY

Aspects of the disclosure provide a method based on standalone secondary synchronization signals (SSSs). The method can include receiving a configuration of an SSS burst at a user equipment (UE) from a base station in a wireless communication network. The SSS burst can include standalone SSSs grouped into SSS sets. Each SSS set can be associated with a beam index. The configuration can indicate frequency and timing locations of the standalone SSSs. The method can further include performing pre-synchronization, radio resource management (RRM) measurement, or cell detection based on the standalone SSSs in the SSS burst.

In an embodiment, each standalone SSS is the same as an SSS in an synchronization signal (SS) block defined for a cell from which the standalone SSS is transmitted, or a shifted version of the SSS in the SS block defined for the cell.

In an embodiment, the SS burst is transmitted over a cell where an SS block burst set is transmitted, timings of the SSS sets in the SSS burst follows a same pattern as that of SS blocks in the SS block burst set, and each SSS set in the SSS burst neighbors one of the SS blocks in the SS block burst set in time domain with or without a gap between each SSS set and the respective SS block.

In an embodiment, each SSS set is transmitted at a same frequency location as the respective SS block. In an embodiment, each SSS set is prepended to the respective SS block.

In an embodiment, each SSS set is appended to the respective SS block. In one example, the pre-synchronization is performed based on a combination of one of the SSS sets and one of the SS blocks neighboring the one of the SSS sets. In one example, the RRM measurement is performed based on SSSs in a combination of one of the SSS sets and one of the SS blocks neighboring the one of the SSS sets.

In one example, the cell detection is performed based on a combination of one of the SSS sets and one of the SS blocks neighboring the one of the SSS sets. A cell group number of the cell is determined based on decoding at least two SSSs in the combination of one of the SSS sets and one of the SS blocks neighboring the one of the SSS sets. In one example, automatic gain control (AGC) is performed to tune a receiving circuit based on one of the standalone SSSs prepended to an SS block, and the SS block is decoded with the adjusted receiving circuit.

In an embodiment, each SSS burst set including a plurality of standalone SSSs that are transmitted over a set of contiguous orthogonal frequency division multiplexing (OFDM) symbols. In an embodiment, timings of the SSS sets in the SSS burst follows a same pattern as that of SS blocks in an SS block burst set. In an embodiment, the SSS sets in the SSS burst are transmitted over contiguous OFDM symbols.

In an embodiment, the RRM measurement is performed based on the standalone SSSs in the SSS burst. In an embodiment, the pre-synchronization based on the standalone SSSs in the SSS burst. In an embodiment, the configuration indicates a time offset of a starting time of the SS burst with respect to a timing of a carrier or a bandwidth part that carries an SS block burst set, and/or a transmission period of the SS burst.

Aspects of the disclosure provide another method based on standalone SSSs. The method can include transmitting a configuration of an SSS burst to a UE from a base station in a wireless communication network. The SSS burst can include standalone SSSs grouped into SSS sets. Each SSS set can be associated with a beam index. The configuration can indicate frequency and timing locations of the standalone SSSs.

Aspects of the disclosure provide an apparatus including circuitry configured to receive a configuration of an SSS burst from a base station in a wireless communication network. The SSS burst can include standalone SSSs grouped into SSS sets. Each SSS set can be associated with a beam index. The configuration can indicate frequency and timing locations of the standalone SSSs. The circuitry can be configured to further perform pre-synchronization, radio resource management (RRM) measurement, or cell detection based on the standalone SSSs in the SSS burst.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF PREFERRED IMPLEMENTATIONS

Figure 1:
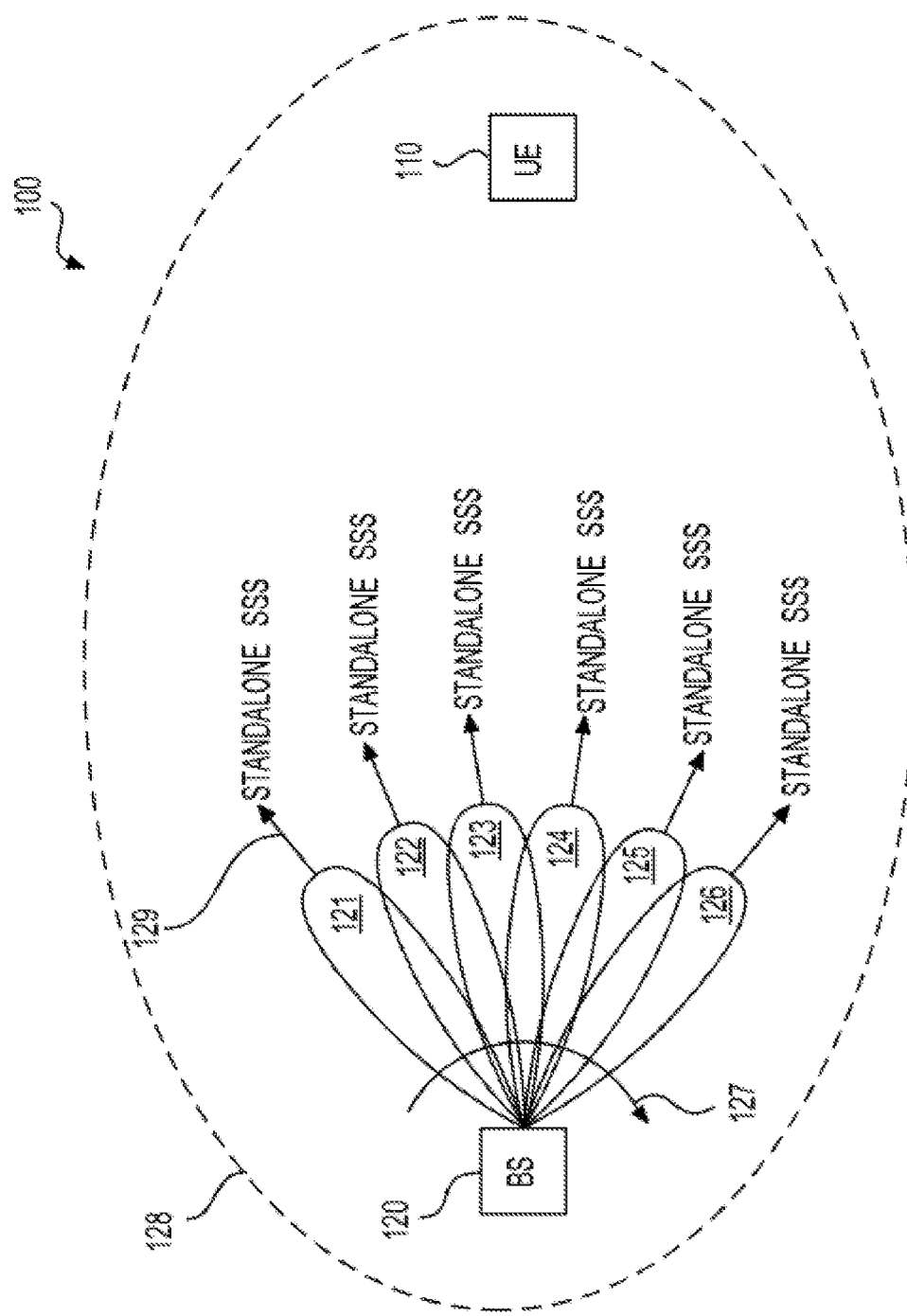
FIG. 1 shows a beam-based wireless communication system 100 according to an embodiment of the disclosure.

According to an aspect of the disclosure, a fifth generation (5G) wireless communication system can be configured to employ standalone secondary synchronization signals (SSSs) to enhance operation performance related with radio resource management (RRM) measurement, pre-synchronization (pre-sync) for data reception, cell search, and other processes.

According to some embodiments, a standalone SSS can be similar to an SSS in a synchronization signal (SS) block specified in 5G New Radio (NR) standards. For example, a standalone SSS can be generated in a way similar to an SSS in an SS block. However, a standalone SSS can be transmitted and utilized independently from other signals in an SS block, such as primary synchronization signal (PSS), physical broadcast channel (PBCH), and demodulation reference signal (DMRS) in an SS block. For example, as specified in current 5G NR standards, an SS block is used as a single unit, and all signals within an SS block are transmitted as a whole in each transmission occasion. In contrast, a standalone SSS can be transmitted without transmission of a whole SS block. In this way, several related processes can be enhanced with reduced overhead.

In some embodiments, standalone SSSs can be organized into an SSS burst. The SSS burst may include multiple sets of SSSs. Each set of SSSs, referred to as an SSS set, can include one or more standalone SSSs, and be associated with a beam index (e.g., transmitted over a beam towards a specific direction). The SSS burst can be transmitted periodically.

In some embodiments, an SSS burst can be transmitted over a carrier or a bandwidth part (BWP) where no SS block is transmitted. Accordingly, a standalone SSS based RRM measurement can be performed based on the SSS burst. Compared with SS block based RRM measurement, an overhead (e.g., radio resources occupied by reference signals) can be reduced. Compared with RRM measurement based on channel state information reference signals (CSI-RSs), a same set of hardware in a synchronization module that is activated for processing SS blocks can be reused for SSS based RRM measurement, and activating a second set of hardware for handling CSI-RS based RRM measurement can be avoided.

In some embodiments, a standalone SSS is disposed near an SS block when transmitted, and is used in combination with an SS block. For example, such a combined signal, with more orthogonal frequency division multiplex (OFDM) symbols, can be used by a high speed user equipment (UE) to perform pre-sync before a data reception (e.g., a paging reception in radio resource control (RRC) idle mode). Compared with SS block based pre-sync, the combined signal can provide more OFDM symbols for Doppler shift related channel estimation, and enable better fine synchronization performance for the UE in high mobility.

Additionally, when standalone SSSs are combined with SS blocks, SS block based cell search performance can also be improved. For example, a standalone SSS combined with an SS block can provide a diversity gain for detecting an SSS, while a standalone SSS prepended to an SS block can be used for an automatic gain control (AGC) tuning to protect reception of an SS block following the SSS.

FIG. 1 shows a beam-based wireless communication system 100 according to an embodiment of the disclosure. The system 100 can include a UE 110 and a base station (BS) 120. In some examples, the system 100 employs 5G NR air interface developed by the 3rd Generation Partnership Project (3GPP). In some examples, the system 100 employs other wireless communication technologies.

In some examples, millimeter Wave (mm-Wave) frequency bands and beamforming technologies are employed in the system 100. Accordingly, the UE 110 and the BS 120 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 120 can be a base station implementing a gNB node as specified in the 5G NR air interface standards developed by 3GPP. The BS 120 can be configured to control one or more antenna arrays to form directional Tx or Rx beams for transmitting or receiving wireless signals. In some examples, different sets of antenna arrays are distributed at different locations to cover different serving areas. Each such set of antenna arrays can be referred to as a transmission reception point (TRP).

In FIG. 1 example, the BS 120 can control a TRP to form Tx beams 121-126 to cover a serving area 128. The beams 121-126 can be generated towards different directions. In one example, the BS 120 can be configured to perform a beam sweeping 127 to transmit downlink signals. During the beam sweeping 127, Tx beams 121-126 towards different directions can be successively formed in a time division multiplex (TDM) manner to cover the serving area 128. The beam sweeping 127 can be performed repeatedly with a certain periodicity. In alternative examples, the beams 121-126 may be generated in a way other than performing a beam sweeping. For example, multiple beams towards different directions may be generated at a same time, or no beam forming is employed. In other examples, different from FIG. 1 example where the beams 121-126 are generated horizontally, the BS 120 can generate beams towards different horizontal or vertical directions. In an example, the maximum number of beams generated from a TRP can be 64.

In one example, SS blocks are transmitted while performing a beam sweeping 127. For example, an SS block can include PSS, SSS, PBCH, and DMRS carried on several consecutive OFDM symbols in an OFDM based system. For example, the BS 120 may periodically transmit a sequence of SS blocks, referred to as an SS block burst set. The SS block burst set may be transmitted by performing a beam sweeping. For example, each SS block of the SS block burst set is transmitted using one of the beams 121-126. The SS blocks may each be associated with an SS block index indicating a timing or location of each SS block among the sequence of SS blocks.

The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals. While only one UE 110 is shown in FIG. 1, a plurality of UEs can be distributed within or outside of the serving area 128, and served by the BS 120 or other BSs not shown in FIG. 1. In FIG. 1 example, the UE 110 is within the coverage of the BS 120.

The UE 110 can operate in RRC connected mode, RRC inactive mode, or RRC idle mode. For example, when the UE 110 is operating in RRC connected mode, an RRC context is established and known to both the UE 110 and the BS 120. The RRC context includes parameters necessary for communication between the UE 110 and the BS 120. An identity of the UE 110, such as a cell radio network temporary identifier (C-RNTI), can be used for signaling between the UE 110 and the BS 120.

When the UE 110 is operating in RRC idle mode, there is no RRC context established. The UE 110 does not belong to a specific cell. For example, no data transfer may take place. The UE 110 sleeps most of the time in order to save power, and wake up according to a paging cycle to monitor if a paging message is coming from network side of the system 100. Triggered by a paging message (e.g., system information updating, or a connection establishment request), the UE 110 may transfer from RRC idle mode to RRC connected mode. For example, the UE 110 can establish uplink synchronization, and an RRC context can be established in both the UE 110 and the BS 120.

When the UE 110 is operating in RRC inactive mode, RRC context is maintained by the UE 110 and the BS 120. However, similar to RRC idle mode, the UE 110 may be configured with discontinuous reception (DRX). For example, the UE 110 sleeps most of the time in order to save power, and wake up according to a paging cycle to monitor paging transmission. When triggered, the UE 110 can promptly transition from RRC inactive mode to RRC connected mode to transmit or receive data with fewer signaling operations than a transition from RRC idle mode to RRC connected mode.

According to an embodiment, the BS 120 can be configured to transmit standalone SSSs 129 to facilitate various processes based on the standalone SSSs 129. For example, the standalone SSSs 129 can be used to perform RRM measurement, pre-sync, or cell search related processes.

In an embodiment, the standalone SSSs 129 can be organized into an SSS burst. The SSS burst can include a sequence of SSS sets each including one or more SSSs. Each SSS set can be associated with a beam index and is transmitted over a respective beam associated with the beam index. The SSS burst can be periodically transmitted.

In an embodiment, an SSS burst is transmitted in a component carrier or a BWP where no SS block is transmitted. In an embodiment, an SSS burst is transmitted in a component carrier or BWP where an SS block burst is transmitted. In the embodiment, each standalone SSS can be adjacent (e.g., prepended or appended) to an SS block, and is used in combination with the SS block.

In an embodiment, a configuration can be transmitted from the BS 120 to inform the UE 110 the usage of standalone SSSs. For example, the configuration can indicate frequency or time locations of standalone SSSs, such that the UE 110 can locate the respective standalone SSSs. For example, the configuration can indicate parameters of an SSS burst transmission, such as a period of the SSS burst transmission, timings of SSS bursts, timings of standalone SSSs within an SSS burst. For example, the configuration can indicate whether standalone SSSs are attached to SS blocks, and additionally, indicate sequence values of standalone SSSs.

According to the configuration information, the UE 110 can perform various processes based on the standalone SSSs. For example, the UE 110 may perform SSS based RRM measurement for RRC connected mode or RRC idle mode mobility management, or for monitoring signal quality of a component carrier or BWP. The UE 110 may perform cell search for initial access, handover, or cell reselection based on a combination of a standalone SSS and an SS block. The UE 110 may perform pre-sync for data reception in RRC idle mode or RRC connected mode based on standalone SSSs or combinations of standalone SSSs and SS blocks. In some scenarios, the UE 110 may additionally report measurement results (e.g., RSRP, or/and RSRQ measurements) to the BS 120 that are obtained based on the standalone SSSs.

Figure 2:
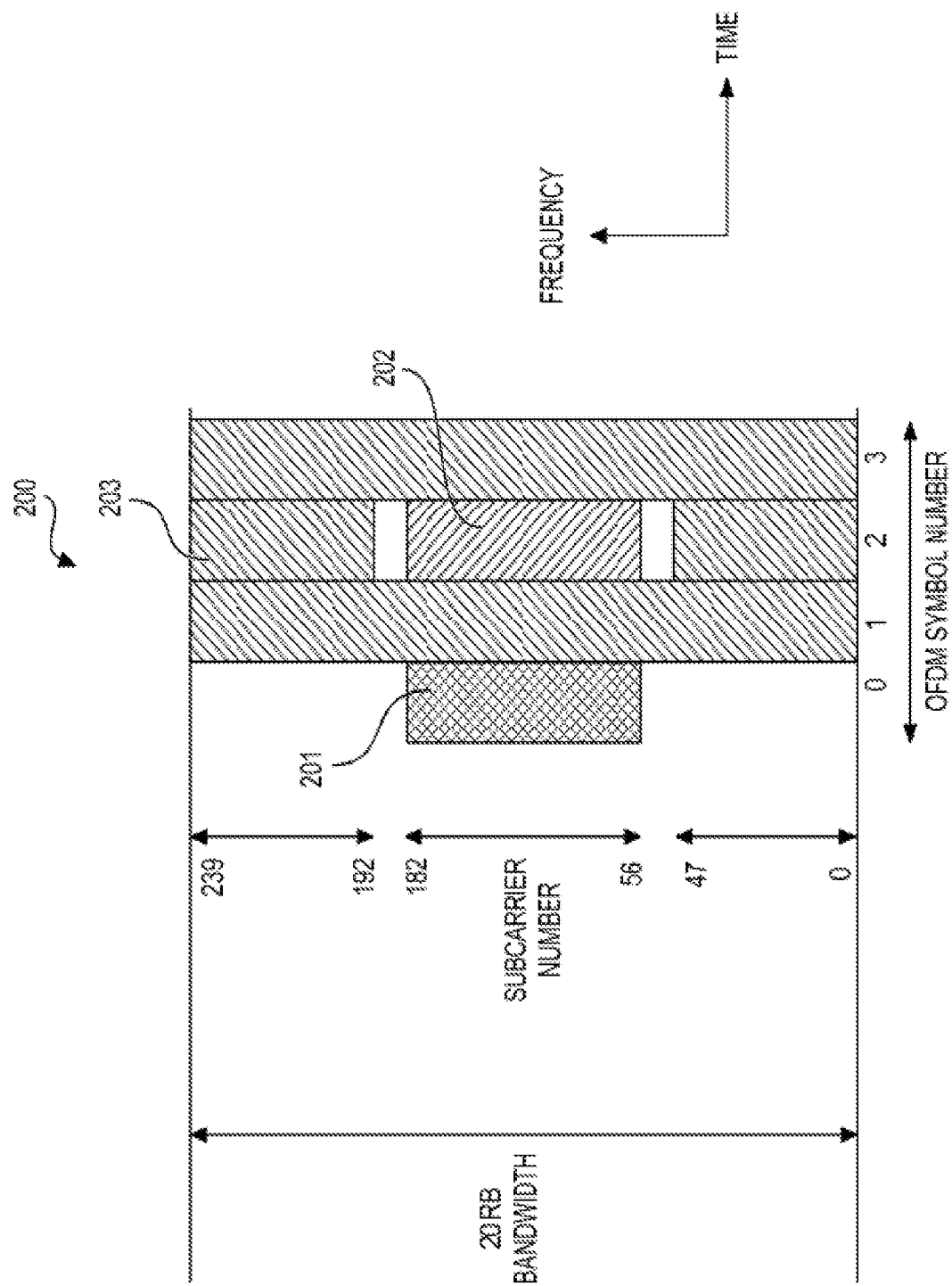
FIG. 2 shows an example of a synchronization signal (SS) block 200 used in the system 100 according to an embodiment of the disclosure.

FIG. 2 shows an example of an SS block 200 used in the system 100 according to an embodiment of the disclosure. The SS block 200 can include a PSS 201, an SSS 202, and a PBCH 203 (represented with shaded areas designated with numbers of 201, 202, and 203). Those signals can be carried in REs on a time-frequency resource grid as shown in FIG. 2. In addition, the SS block 200 can carry DMRSs (not shown) in a subset of REs in the shaded area 203. The REs carrying DMRSs are not used for carrying PBCH signals in one example.

In one example, the SS block 200 can be distributed over 4 OFDM symbols in time domain and occupy a 20 resource block (RB) bandwidth in frequency domain. As shown in FIG. 2, the 4 OFDM symbols are numbered from 0 to 3, while the 20 RB bandwidth includes 240 subcarriers numbered from 0 to 239. Specifically, the PSS 201 can occupy REs at symbol 0 and subcarriers 56-182. The SSS 202 can occupy REs at symbol 2 and subcarriers 56-182. The PBCH 203 can be located at symbols 1-3 occupying 20 RBs at symbols 1 and 3, and 8 RBs (96 subcarriers) at symbol 2.

In one example, the SS block 200 is configured to carry bits of an SS block index by using the DMRSs and the PBCH 203. In one example, by decoding the PSS 201 and the SSS 202, a physical layer cell identification (ID) can be determined. The cell ID indicates which cell the SS block 200 is associated with.

It is noted that SS blocks in various examples may have structures different from the FIG. 2 example. For example, number of OFDM symbols in an SS block may be fewer or more than four. OFDM symbols carrying SSs and OFDM symbols carrying PBCH may be arranged in different order in time domain. Bandwidth of an SS block may be different from that of FIG. 2 example. REs assigned for SSs or PBCH may by more or less than that in FIG. 2 example.

Figure 3:
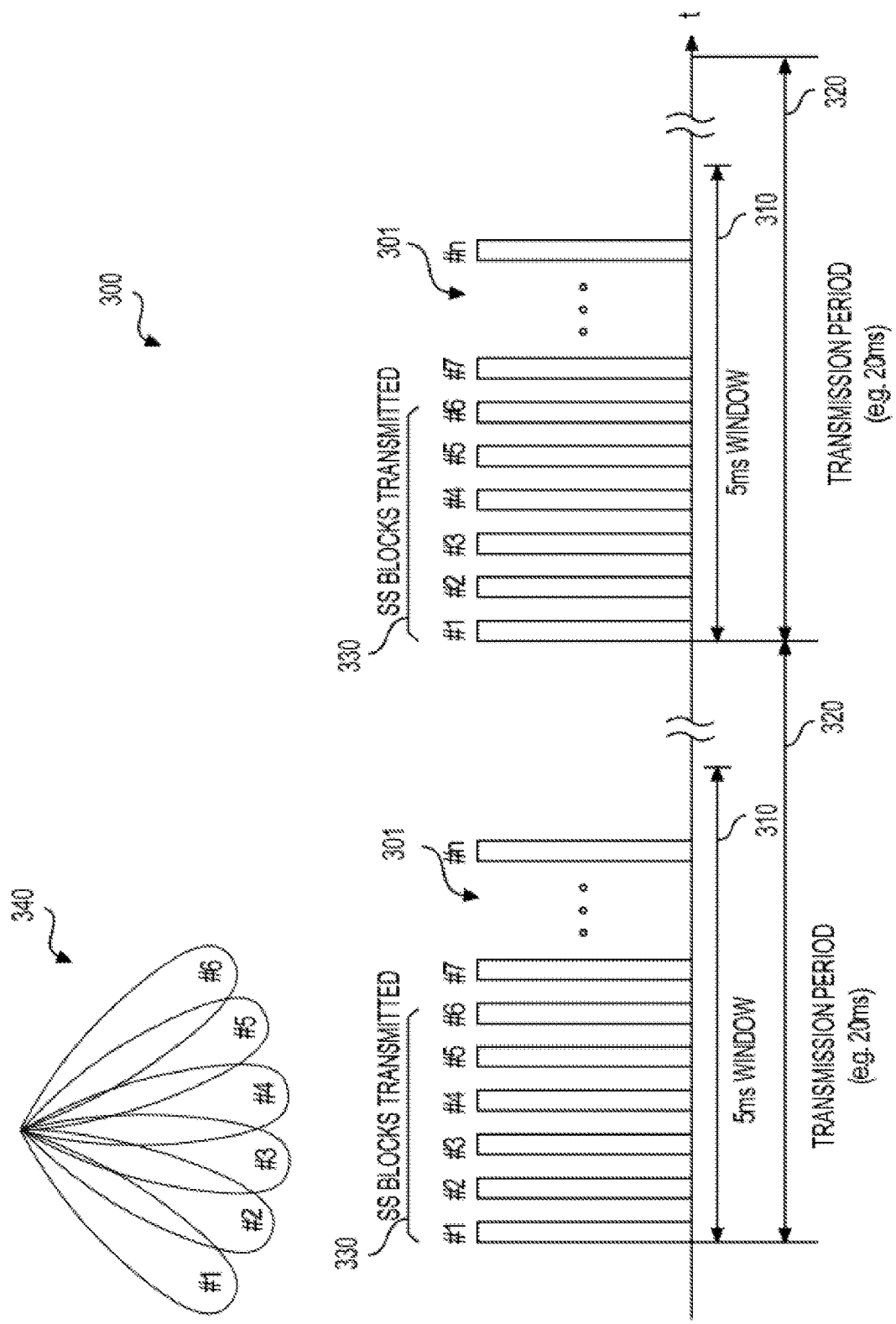
FIG. 3 shows an example SS block transmission configuration 300 according to an embodiment of the disclosure.

FIG. 3 shows an example SS block transmission configuration 300 according to an embodiment of the disclosure. According to the configuration 300, a sequence 301 of SS blocks, referred to as SS block burst set 301, can be transmitted with a transmission period 320 (e.g., 5, 10, 20, 40, 80, or 160 ms) in a sequence of radio frames. The SS block burst set 301 can be confined within a half frame transmission window 310 (e.g., 5 ms). Each configured SS block can have an SS block index (e.g., from #1 to #n). The SS blocks of the SS block set 301 are configured as candidate SS blocks, but may not be used for actual transmissions of SS blocks. For example, a cell 340 employs 6 beams from #1 to #6 to cover a serving area and transmits SS blocks based on the configuration 300. Accordingly, only a subset 330 of the SS block set 301 is transmitted. For example, the transmitted SS blocks 330 may include the first six candidate SS blocks of the SS block set 301 each corresponding to one of the beams #146. Resources corresponding to other candidate SS blocks from #7 to #n can be used for transmission of data other than SS blocks.

Figure 4:
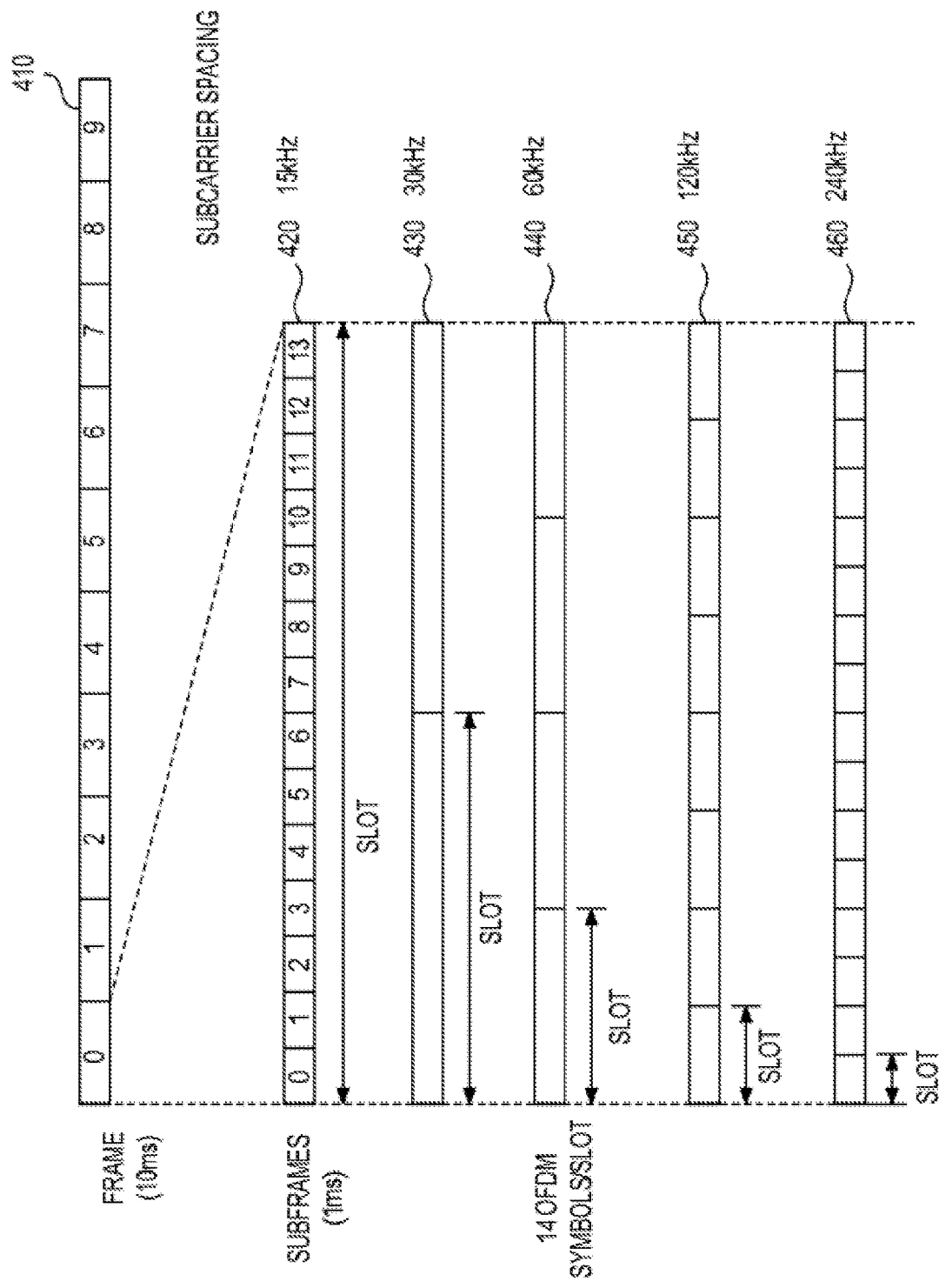
FIG. 4 shows example frame structures used in the system 100 corresponding to different numerologies or subcarrier spacings according to an embodiment of the disclosure.

FIG. 4 shows example frame structures used in the system 100 corresponding to different numerologies or subcarrier spacings according to an embodiment of the disclosure. A radio frame 410 can last for 10 ms and include 10 subframes that each last for 1 ms. Corresponding to different numerologies and respective subcarrier spacings, a subframe may include different number of slots. For example, for a subcarrier spacing of 15 kHz, 30 kHz, 60 kHz, 120 kHz, or 240 kHz, a respective subframe 420-460 can include 1, 2, 4, 8, or 16 slots, respectively. Each slot may include 14 OFDM symbols in one example. In alterative examples, different frame structures may be employed. For example, a slot may include 7 or 28 OFDM symbols.

Figure 5:
FIG. 5 shows a table 500 including example SS block configurations within a 5 ms half frame time window according to an embodiment of the disclosure.

FIG. 5 shows a table 500 including example SS block configurations within a 5 ms half frame time window according to an embodiment of the disclosure. The table 500 shows five cases A-E of SS block configurations in five rows of the table 500. The five cases A-E correspond to different subcarrier spacing configurations of a cell. For each case, indexes of first OFDM symbols in each SS block within a half frame (e.g., 5 ms) are specified.

For example, in case A with 15 kHz subcarrier spacing, the first symbols of the candidate SS blocks have symbol indexes of (2, 8)+14n. For carrier frequencies smaller than or equal to 3 GHz, n=0, 1, corresponding to a total number of L=4 SS blocks. Accordingly, the 4 candidate SS blocks can have SS block indexes in an ascending order in time from 0 to 3. For carrier frequencies higher than 3 GHz and smaller than or equal to 6 GHz, n=0, 1, 2, 3, corresponding to a total number of L=8 candidate SS blocks. Accordingly, the 8 candidate SS blocks can have SS block indexes in an ascending order in time from 0 to 7.

For another example, in case D with 120 kHz subcarrier spacing, the first symbols of the candidate SS blocks have symbol indexes of (4, 8, 16, 20)+28n. For carrier frequencies higher than 6 GHz, n=0, 1, 2, 3, 5, 6, 7, 8, 10, 11, 12, 13, 15, 16, 17, 18, corresponding to a total number of L=64 candidate SS blocks. Accordingly, the 64 candidate SS blocks can have SS block indexes in an ascending order in time from 0 to 63.

It is noted that SS block configurations different from that shown in FIG. 5 may be used in other examples.

Figure 6:
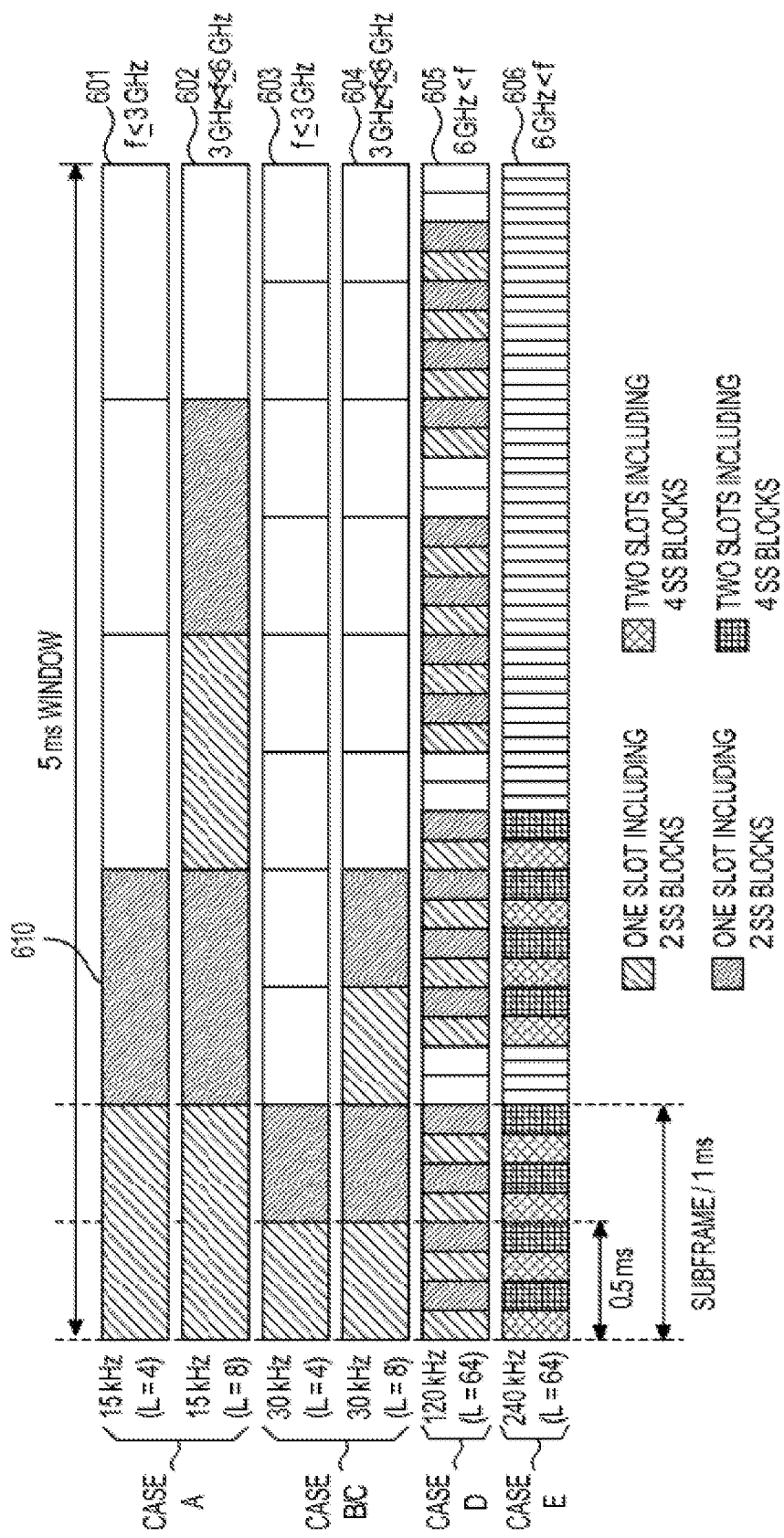
FIG. 6-FIG. 8 illustrate the SS block configurations of cases A-E in FIG. 5.
Figure 7:
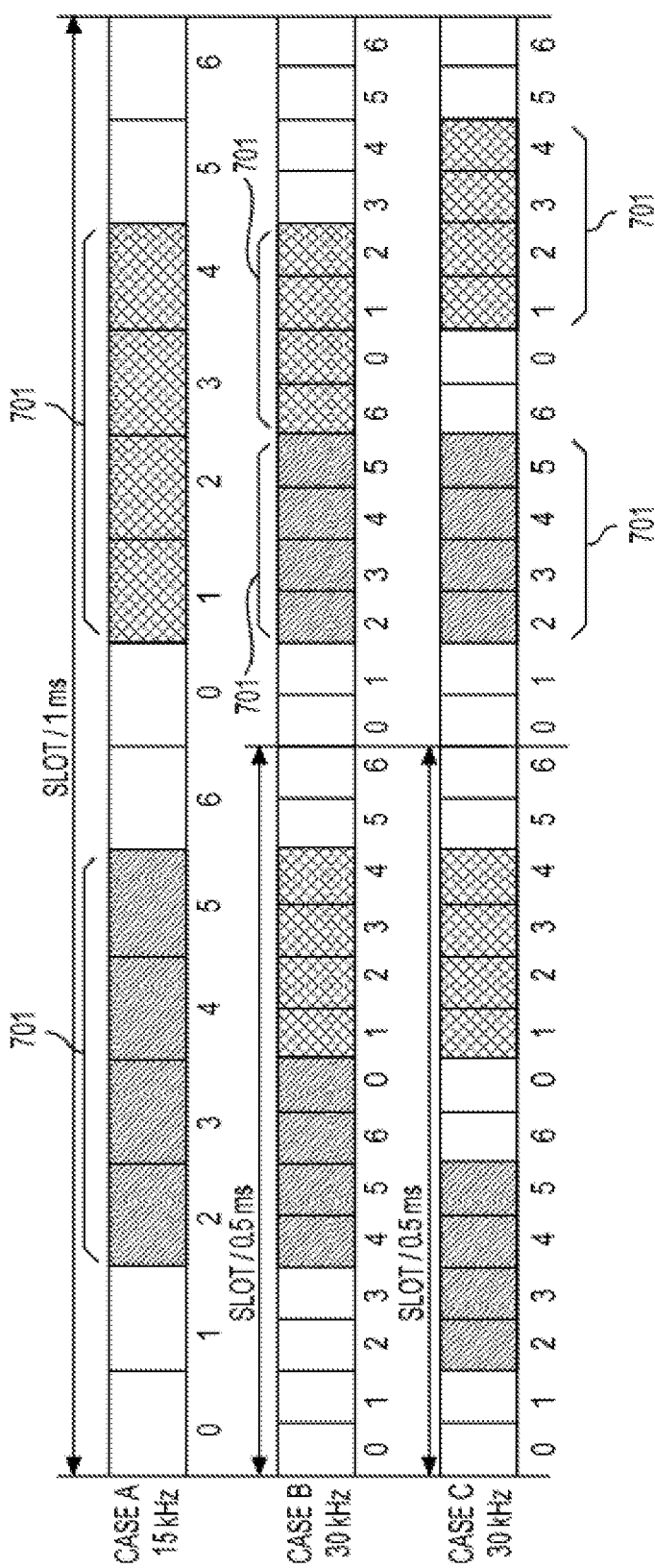
Figure 8:
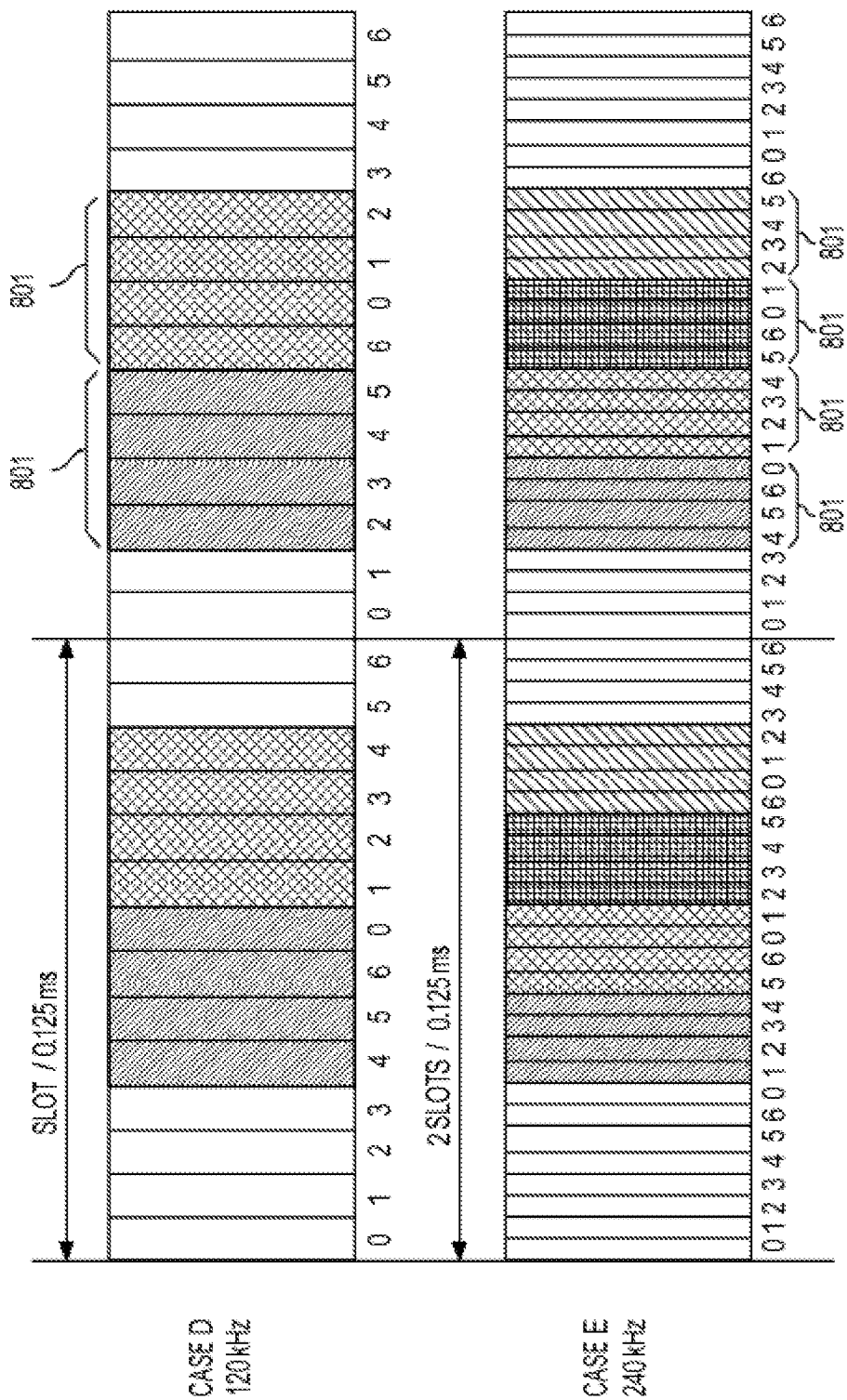

FIGS. 6-8 illustrate the SS block configurations of cases A-E in FIG. 5. Specifically, FIG. 6 shows six SS block configurations 601-606 corresponding to different combinations of subcarrier spacings and frequency bands. In each configuration 601-606, slots containing SS blocks within a half frame window are shown with shaded rectangles 610. FIGS. 7 and 8 show zoomed-in views of how SS blocks 701 or 801 are distributed over sequences of symbols in time domain.

Figure 9:
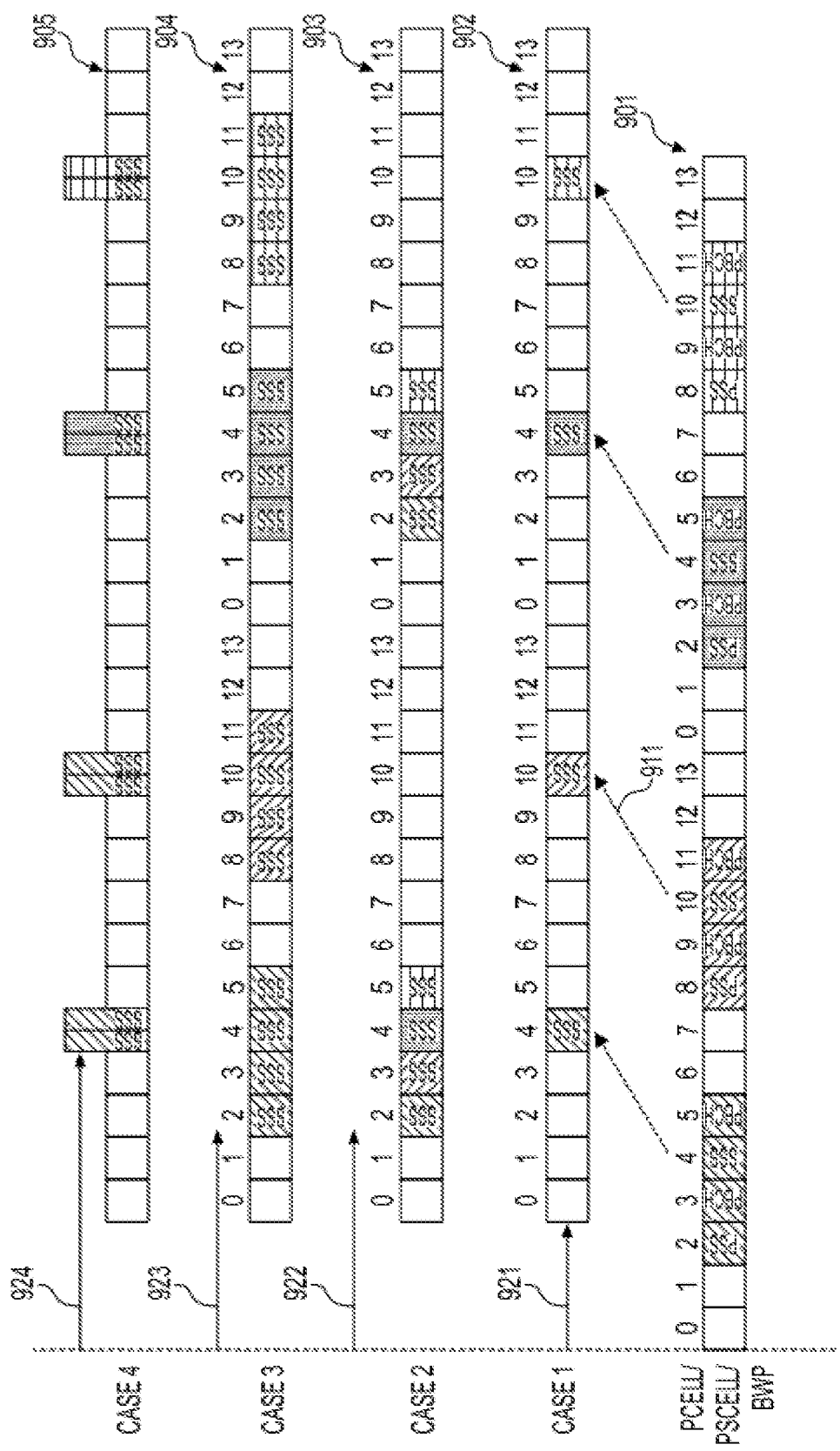
FIG. 9 shows secondary synchronization signal (SSS) burst transmission examples according some embodiments of the disclosure.

FIG. 9 shows SSS burst transmission examples according to some embodiments of the disclosure. Four cases (Case 1 to Case 4) of standalone SSS transmission with different SSS burst configurations are illustrated. Each case shows one (in Case 1, 3, and 4) or two (in Case 2) SSS bursts 902-905 over a component carrier or BWP where no SS block is transmitted. An SS block burst set 901 is also shown that can be transmitted over a PCell, a PSCell, or a BWP. In various embodiments, the SSS bursts 902-905 can be employed to perform SSS based RRM measurement.

The PCell/PSCell/BWP carrying the SS block burst set 901 can have subcarrier spacing of 15 kHz or 30 kHz (e.g., Case A or Case C in FIG. 7) in the FIG. 9 example. The SS block burst set 901 can include 4 SS blocks transmitted over two slots each including 14 OFDM symbols. The 4 SS blocks can each be associated with a beam index corresponding to a beam, and can be transmitted over the respective beams in a beam sweeping.

In Case 1 of the standalone SSS transmission, the respective component carrier or BWP carrying the SSS burst 902 can have a same subcarrier spacing as that of the SS block burst set 901. The SSS burst 902 includes 4 standalone SSSs. As shown, in contrast to SSSs in each SS block in the SS block burst set 901, the standalone SSSs are each transmitted without PSS, or PBCH signals being transmitted. In an embodiment, the standalone SSSs in the SSS burst are arranged in a same frequency location.

Each of the 4 standalone SSSs in the SSS burst 902 can correspond to one SS block in the SS block burst set 901 in terms of transmission beams, which is indicated by the same drawing pattern applied to each SS block and each standalone SSS of the SSS burst 902. For example, each pair of the corresponding SS block and standalone SSS can be associated (e.g., explicitly or implicitly) with a same beam index and transmitted using a same beam. In addition, the standalone SSSs in the SSS burst 902 follows a same timing pattern as the SS blocks in the SS block burst set 901, which is indicated by arrows 911. For example, distances in time domain between starting symbols of the standalone SSSs and starting times of the SS blocks can be the same.

In an embodiment, time locations of the standalone SSSs in the SSS burst 902 is specifically configured such that there is no overlap between the standalone SSSs and the SSSs in each SS block of the SS block burst set 901. In this way, interference between those two sets of SSSs can be avoided.

In Case 2 of the standalone SSS transmission, the respective component carrier or BWP can have a same subcarrier spacing as that of the SS block burst set 901. The two SSS bursts 903 can each include 4 standalone SSSs. Similar to Case 1, each standalone SSS in Case 2 can correspond one SS block in terms of transmission beams. However, the SSS bursts 903 follow a timing pattern different from the SSS burst 902. Specifically, the standalone SSSs within each SSS burst 903 are transmitted over consecutive OFDM symbols. Under such configuration, RRM measurement over four transmission directions (or four transmission beams) can be carried out within a shorter period than under the configuration of the SSS burst 902.

In addition, instead of transmitting one standalone SSS in one beam direction, more than one standalone SSSs can be transmitted for each beam direction. For example, one SSS burst 903 can include 4 SSS sets each including two standalone SSSs. Accordingly, 8 standalone SSSs can be transmitted over 8 consecutive OFDM symbols via one beam sweeping covering 4 directions (assuming 4 beams are used). In this way, more OFDM symbols can be employed for RRM measurement in a short period to improve measurement accuracy, or to reduce overall measurement time.

In Case 3 of the standalone SSS transmission, the respective component carrier or BWP can have a same subcarrier spacing as that of the SS block burst set 901. The SSS burst 904 includes 4 SSS sets each including 4 standalone SSSs. Similar to the SSS burst 902, timings of each SSS set in the SSS burst 904 can follow the same timing pattern as the SS block burst set 901, and each SSS set in the SSS burst 904 correspond to one respective SS block in the SS block burst set 901. However, in contrast to the SSS burst 902, the density of standalone SSSs in time domain in each SSS set is four times of that in the SSS burst 902. The higher density can help to improve RRM measurement accuracy or reduce overall measurement time. It is noted that in other examples, the standalone SSSs in each SSS set in Case 3 may be transmitted over nonconsecutive OFDM symbols.

In Case 4 of the standalone SSS transmission, the respective component carrier or BWP can have a subcarrier spacing (e.g., 60 kHz) higher than that of the SS block burst set 901. Accordingly, corresponding to one OFDM symbol in the PCell/PACell/BWP carrying the SS block burst set 901, there can be two OFDM symbols in Case 4. As shown, the SSS burst 905 includes 4 SSS sets each including two standalone SSSs. Similarly, each SSS set in the SSS burst 905 can correspond to one SS block in the SS block set 901, and timings of the SSS sets follow the timing pattern of the SS blocks in the SS block burst set 901.

In an embodiment, timing of an SSS burst can be specified with respect to a carrier containing an SS block burst set. For example, a UE may employ carrier aggregation for data transmission and reception over a set of component carriers. In the aggregated component carriers, a PCell or PSCell may carry SS block burst set transmissions, while some SCells may not carry SS block burst set transmissions. In some scenarios, those SCells can be synchronized with the PCell. Accordingly, a time offset with respect to the PCell can be specified to indicate, for example, a starting time of an SSS burst in a SCell.

As an example, in Case 1 of the standalone SSS transmission, a time offset 921 can be specified which indicates a starting time of a slot containing the first SSS of the SSS burst 902. The standalone SSSs in the SSS burst 902 each are configured to occupy the same OFDM symbols (e.g., 4th or 10th OFDM symbol of the respective slot) as the SSSs in each SS block in the SS block burst set 901. Accordingly, timings of the standalone SSSs can be determined based on the specified time offset and configured time locations of the standalone SSSs in the SSS burst 902. In Cases 2-4, a time offset 922, 923, or 924 can be specified to indicate a starting time of the starting symbol of the respective SSS burst. Those time offsets can be configured, for example, from the BS 120 to the UE 110 to facilitate the UE 110 to determine timings of standalone SSSs.

In addition to the time offsets, timing patterns of respective SSS bursts (e.g., time locations of standalone SSSs within an SSS burst), and transmission periods of respective bursts can also be configured from the BS 120 to the UE 110 to help the UE 110 to locate standalone SSSs in time domain.

In an embodiment, sequence values of standalone SSSs are configured from a serving cell to the UE 110, such that blindly decoding of the standalone SSSs can be avoided to save power. For example, parameters for constructing standalone SSS sequences (e.g., cell ID, or cyclic shift values) can be configured to the UE 110, such that the UE 110 can determine the respective SSS sequences.

In an embodiment, quasi-co-location (QCL) types between standalone SSSs and SSS blocks can be configured to the UE 110. For example, the QCL types can include:
QCL-TypeA: {Doppler shift, Doppler spread, average delay, delay spread};
QCL-TypeB: {Doppler shift, Doppler spread};
QCL-TypeC: {Average delay, Doppler shift}; and
QCL-TypeD: {Spatial Rx parameter}.

In some embodiments, SSS bursts, such as those described with reference to FIG. 9, can also be used for pre-sync purpose. For example, a UE in high mobility (e.g., high seed train) can perform a fine synchronization based on an SSS set transmitted over a group of consecutive OFDM symbols (e.g., in Case 3).

In the examples of standalone SSS transmissions described with reference to FIG. 9, the component carriers or BWPs that carry standalone SSSs do not contain transmissions of PSS or PBCH. In contrast, in other examples, component carriers or BWPs that carry standalone SSSs can contain transmissions of SS blocks. For example, SS block burst sets are typically contained in a 5 ms window, and transmitted periodically. During gaps among the SS block burst sets, standalone SSS transmission can be configured. Those standalone SSSs can be employed for RRM measurement or pre-sync for data reception.

It is noted that while some examples of standalone SSS transmission are described in the context of beam forming or beam sweeping, transmission of standalone SSS can be independent from beam forming or beam sweeping operations. For example, in a system operating at a spectrum below 6 GHz, beam sweeping transmission may not be employed. In such a scenario, standalone SSSs can still be used. For example, an SSS burst may be configured to include only one SSS set that include one SSS or a sequence of SSS over a set of consecutive or nonconsecutive OFDM symbols. Such an SSS set may be transmitted omnidirectionally to cover a whole serving area of a cell.

A system implementing 3GPP Long Term Evolution (LTE) standards may transmit SSSs separately from PSS or PBCH signals. However, the SSSs in LTE are transmitted in fixed locations in every frame. In contrast, standalone SSS transmission can have different structure and be associated with beams. For example, standalone SSSs can be organized into SSS bursts. The SSS bursts can be transmitted periodically. An SSS burst can include multiple SSS sets each corresponding to a transmission beam. Accordingly, an SSS burst can be transmitted in combination with a beam sweeping where each SSS set is transmitted over a beam towards different directions.

In some example, SS blocks are transmitted in place of standalone SSSs and used for SSS based RRM measurement. However, because only SSSs in each SS block are useful for the RRM measurement, transmission resources carrying PSS and PBCH can be wasted. Employment of standalone SSSs can accordingly save the above overhead, and thus is superior to using SS blocks.

In some examples, CSI-RSs are transmitted in place of standalone SSSs and used for RRM measurement. However, an additional piece of hardware different from that of processing the SS blocks may have to be activated, which increases power consumption and complexity. Accordingly, using the standalone SSSs can be a better choice compared with using the CSI-RSs.

It is noted that, while in the FIG. 9 example, the SS block burst set 901 is shown to have 4 SS blocks, in other examples, the SS block burst set 901 may include other number of SS blocks, such as 1, 2, 3, 5, 6, and the like.

Accordingly, the number of SSS sets in one SSS burst 902, 903, 904, or 905, can also take various numbers that can correspond to the number of SS blocks in the SS block burst set 901.

Figure 10:
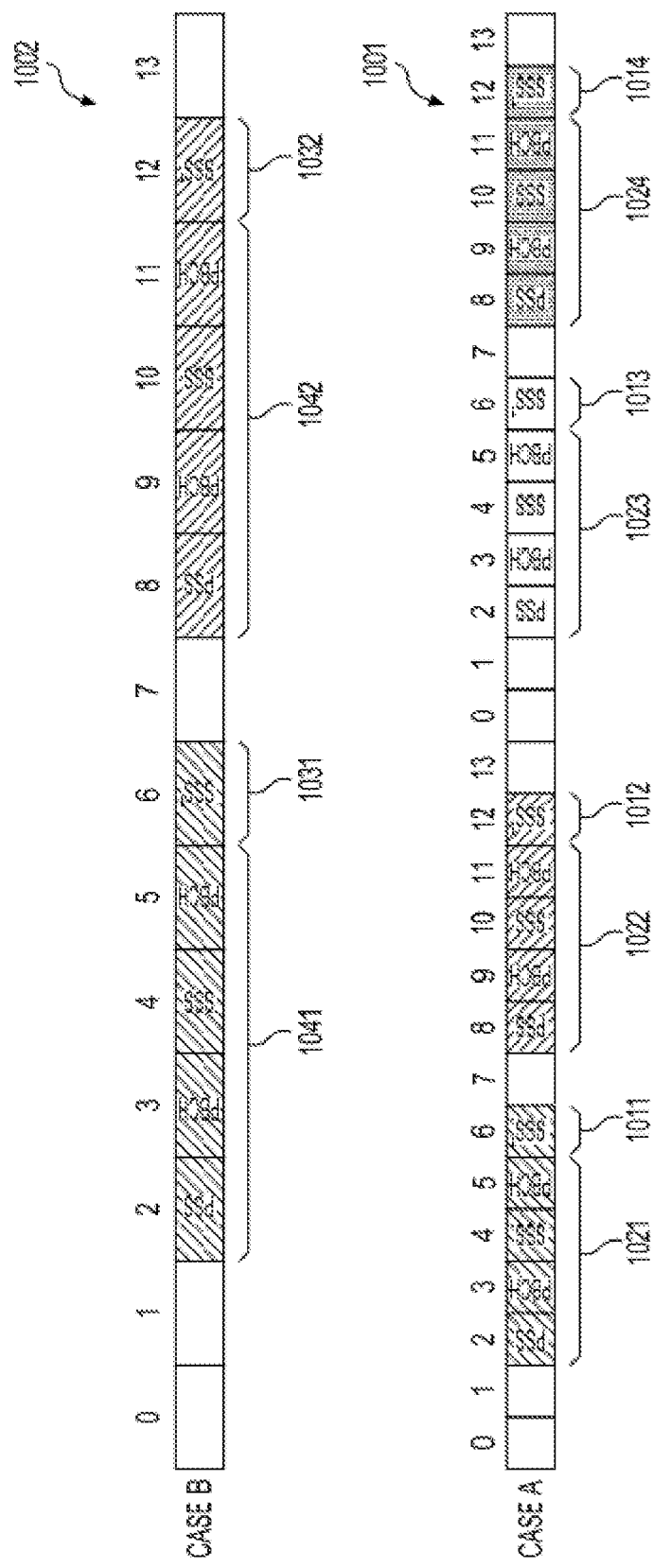
FIG. 10 shows other SSS burst transmission examples according some embodiments of the disclosure.

FIG. 10 shows other SSS burst transmission examples according some embodiments of the disclosure. Two cases (Case A and Case B) of standalone SSS transmission with different SSS burst configurations are illustrated. Case A shows an SSS burst 1001 that includes 4 standalone SSSs 1011-1014 transmitted over the 6th and 12th OFDM symbols in two slots. Case B shows an SSS burst 1002 that includes 2 standalone SSSs 1041-1042 transmitted over the 6th and 12th OFDM symbols in one slot. In FIG. 10 example, a first subcarrier spacing of Case A is 30 kHz, while a second subcarrier spacing of Case B is 15 kHz.

In contrast to the FIG. 9 example, in the FIG. 10 example, each standalone SSS is arranged to neighbor an SS block to form a combined signal that includes an SS block and a standalone SSS. For example, a first SS block burst including 4 SS blocks 1021-1024 is shown in case A. Each SS block 1021-1024 is appended with a standalone SSS 1011-1014. Similarly, a second SS block burst including 2 SS blocks 1041-1042 is shown in case B. Each SS block 1041-1042 is appended with a standalone SSS 1031-1032. In some examples, frequency locations of the standalone SSSs 1011-1014 or 1031-1032 can be the same as the respective SSSs in the SS blocks. In some examples, the frequency locations of the standalone SSSs 1011-1014 or 1031-1032 can be different from the SSSs in the SS blocks. In various examples, QCL types between the standalone SSSs and the respective SS blocks can be assumed implicitly, or can be configured by signaling explicitly.

In some embodiments, the combined signals as shown in FIG. 10 are used in pre-sync for data reception. For example, a pre-sync can be performed by a UE before data reception (e.g., paging reception or system information reception in RRC idle mode, or control or data reception in RRC connected mode). During pre-sync, signals received over several OFDM symbols can be combined to perform channel estimation, such as estimation of Doppler spread, Doppler delay, and the like. Based on such channel estimation, a frequency and time synchronization can be performed, and subsequently, coherent demodulation of subsequent control or data reception can be performed.

In some examples, SS blocks are used in pre-sync without combination with standalone SSSs. In such a case, only three OFDM symbols (e.g., the last three symbols in one SS block) are available for pre-sync. In contrast, when a standalone SSS is combined with an SS block, the respective SS block can be extended and more OFDM symbols are available for pre-sync operations, thus pre-sync performance can be improved. For example, as shown in FIG. 10, at the combination of the SS block 1041 and the standalone SSS 1031 in Case B, the 3th, 4th, 5th, and 6th symbols corresponding to signals PBCH, SSS, PBCH, and SSS can be combined to perform a pre-sync process.

Particularly, for a high speed UE, three symbols based on an SSS block may be insufficient for pre-sync purpose. By combining one or more standalone SSSs with an SS block, the problem related with frequency and time synchronization and channel estimation in high mobility scenarios can be solved.

In some examples, UE-specific tracking reference signals (TRS) are additionally provided for frequency/time synchronization or channel estimation in place of SS blocks. However, for a UE operating in RRC idle mode, the UE-specific TRSs cannot be supported, and thus are unavailable for pre-sync. In contrast, the standalone SSSs in combination with SS blocks can be employed.

In addition, even in RRC connected mode, the combined signals can still be a better choice than using TRSs under certain scenarios. For example, for a frequency carrier carrying SS block signals, the SS block signals would be transmitted periodically. Additional transmitting one standalone SSS for each SS block incurs a fewer overhead compared with, for example, transmitting 4 additional TRSs corresponding to each SS block (or each beam direction).

In some embodiments, standalone SSSs in combination with SS blocks are used for RRM measurement. For example, SSS based RSRP or RSRQ measurement can be obtained based on combined signals each include one or more standalone SSSs and an SS block. Compared with SS block based RRM, at least one more standalone SSS is available for the measurement. Such densified SSSs can be used to improve RRM measurement accuracy or reduce measurement time.

In various examples, the combined signals can be used in RRM measurement for mobility management or beam management. For example, based on the combined signals, inter- or intra-frequency RRM measurement can be performed by a UE in RRC idle mode or RRC connected mode to make cell reselection, handover, or beam selection decisions.

In addition to the above described applications, standalone SSSs, when combined with SS blocks, can also be employed to improve performance of SS block signals. For example, an additional standalone SSS can be used to provide a diversity gain for decoding SSSs. For example, transmission of the SS blocks in Case A of FIG. 10 may be synchronized with transmission of SS blocks in neighbor cells over a same frequency layer. As a result, the SSS in the SS block 1021 may be interfered by SSSs transmitted in neighbor cells, which may degrade the SSS decoding performance. As known in the art, the SSSs among neighboring cells are sequences of a same type but with different cyclic shifts. Cross-correlation between those SSSs can be different for different pair of SSSs. Accordingly, the standalone SSS 1011 can be configured to be an SSS sequence different from the SSS within the SSS block 1021. In this way, these two SSSs may experience different cross-correlation interference, and thus when combined, may potentially improve the SSS decoding performance.

For example, the BS 120 may configure a shift value to the UE 110 such that the UE 110 can determine that the standalone SSS 1011 is a shifted version of the SSS within the SSS block 1021. With this knowledge, the UE 110 may detect those two SSSs accordingly. The one with a higher cross-correlation with a respective local version SSS can be adopted to determine a cell group number carried in the respective SSS.

In another example, a standalone SSS prepended to an SS block can be used to protect decoding of the SS block. For example, AGC may be performed when decoding the first symbol of the SS block 1021 to tune receiver circuitry. If the AGC tuning is not successful, the PSS of the SS block 1021 may be lost (e.g., detection of the PSS fails). In contrast, the standalone SSS prior to the SS block 1021 can be used to perform the AGC tuning before starting the decoding of the PSS symbol. As a result, the PSS would be decoded with a higher probability of being successful, thus improving the SS block decoding performance.

While only one standalone SSS is shown to be attached to the respective SS blocks, in other examples, more than one standalone SSSs can be appended or prepended to an SS block depending on available OFDM symbols for carrying the standalone SSSs. In addition, there can be a gap (e.g., one or two symbols) between an SS block and a standalone SSS combined with the SS block.

Examples of methods for generation of SSS sequences are described blow.

In an embodiment, Gold sequences are generated for SSSs in SS blocks. For example, a sequence $d_{SSS}(n)$ for an SSS used in a cell (or frequency carrier) can be defined by $$d_{sss}(n) = [1 - 2x_0((n+m_0) \bmod 127)][1 - 2x_1((n+m_1) \bmod 127)] \quad (1)$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

where $$x_0(i+7) = (x_0(i+4) + x_0(i)) \bmod 2$$

$$x_1(i+7) = (x_1(i+1) + x_1(i)) \bmod 2$$

$$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1],$$

and $N_{ID}^{(1)}$ denotes a cell group number while $N_{ID}^{(2)}$ denotes a cell number within a cell group. $N_{ID}^{(1)}$ and $N_{ID}^{(2)}$ can be associated and determined according to a physical cell ID (PSI) of the respective cell.

As described above, in some embodiments, a standalone SSS can be the same or different from an SSS sequence (as included in an SS block) of a cell that transmits the standalone SSS. For example, in case a standalone SSS over a cell is different from an SSS sequence in an SS block over the same cell, the standalone SSS can be a shift of the SSS in the SSS block. Such a shift can be fixed, pre-defined or configured by signaling from network side.

As an example, based on the group of expressions (1), a sequence for an standalone SSS, denoted by $d_{standalone\_SSS}(n)$, can be defined by $$d_{standalone\_SSS}(n) = [1 - \quad (2)$$
$$2x_0((n+m_0+k_0) \bmod 127)][1 - 2x_1((n+m_1+k_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

Where k0 and k1 are the shift values that can be used for generating different standalone SSS sequences. The shift values, k0 and k1, can be same or different values, and can be fixed, pre-configured or given by a network configuration.

In case a standalone SSS is transmitted over a cell where no SS block is transmitted, this standalone SSS can still be generated from the group of expressions (2) based on a PSI (indicated by $N_{ID}^{(1)}$ and $N_{ID}^{(2)}$, and optionally one or two shift values k0 and k1.

Figure 11:
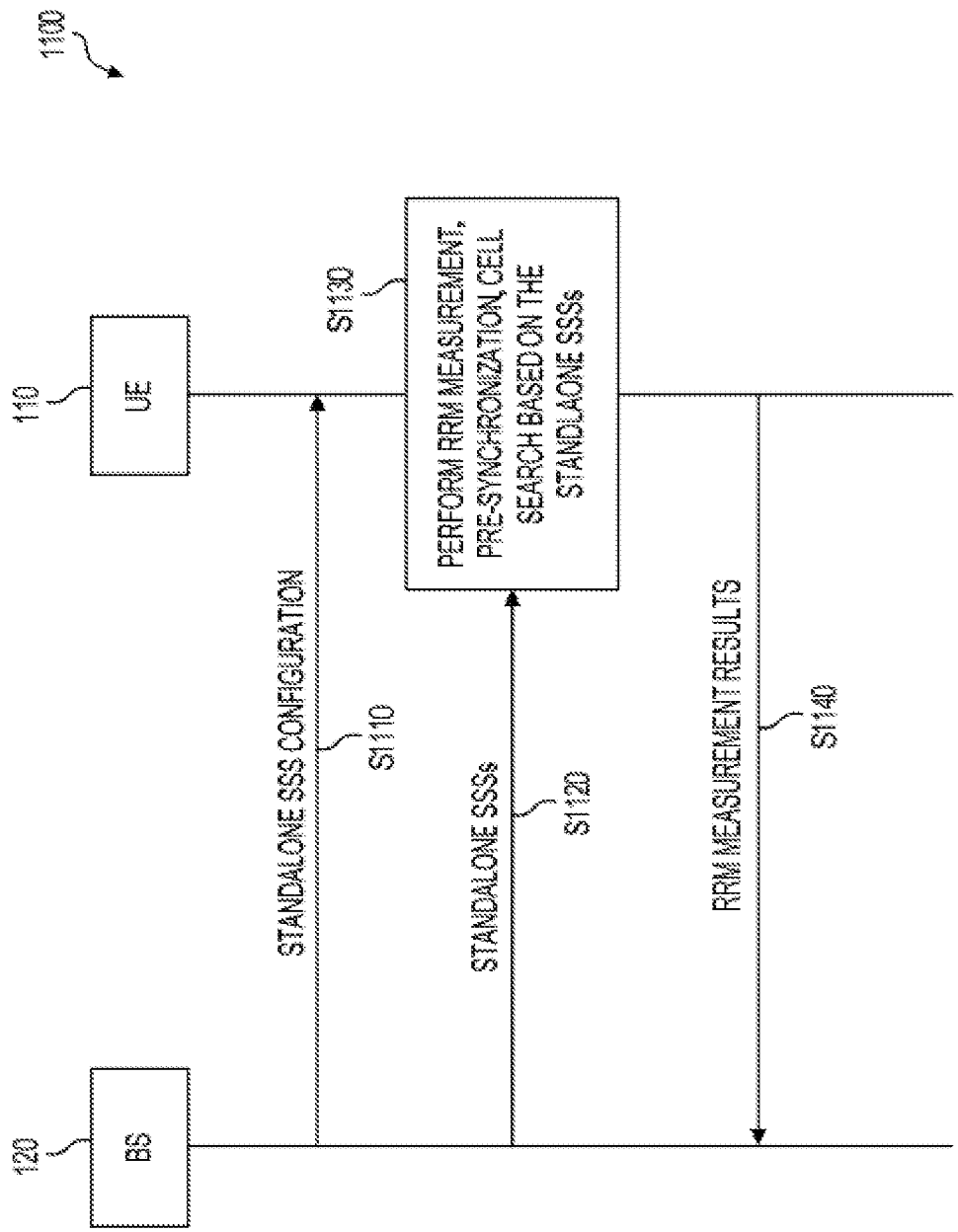
FIG. 11 shows a process 1100 based standalone SSSs according to some embodiments of the disclosure.

FIG. 11 shows a process 1100 according to some embodiments of the disclosure. The process 1100 is based on standalone SSSs. The BS 120 and the UE 110 in the FIG. 1 example are used as examples to explain the process 1100. The process 1100 can include steps S1110-S1140.

At S1110, a configuration of standalone SSSs can be transmitted from the BS 120 to the UE 110. The configuration can include parameters related to transmission of standalone SSSs. Based on the configuration, the UE 110 can determine time and frequency locations of the standalone SSSs, and accordingly receive the standalone SSSs.

For example, the standalone SSSs can be formed into a sequence of SSS bursts that are transmitted over a component carrier or a BWP where no SS block is transmitted. The configuration may indicate a time offset of an SSS burst with respect to a primary cell or a BWP where SS blocks are transmitted. The configuration may further indicate timings of SSS sets within the SSS burst. For example, timings of SSS sets may or may not follow a pattern of timings of the SS blocks. The configuration may further indicate a period for transmission of the sequence of SSS bursts. The configuration may further indicate whether the standalone SSSs are the same or different from the respective SS blocks. The configuration may further indicate one or more shift values that can be used to determine the respective standalone SSSs that are shifted versions of SSSs in respective SS blocks.

For another example, the standalone SSSs may be transmitted over a cell where SS blocks are transmitted. The configuration may indicate the standalone SSSs are to be used in combination with SS blocks. For example, the configuration may indicate positions of the standalone SSSs with respect to the SS blocks, such as whether the standalone SSSs are prepended or appended to the respective SS blocks. The configuration may optionally indicate if the standalone SSSs are the same or different from the respective to-be-combined SS blocks. The configuration may further indicate one or more shift values that can be used to determine the respective standalone SSSs that are shifted versions of SSSs in respective SS blocks.

In various examples, the configuration can be broadcasted, for example, through system information broadcasting, or the configuration can be dedicated to a specific UE through RRC signaling, downlink control channel, control element in MAC layer, and the like.

In some embodiments, the standalone SSSs may be transmit according to a default configuration (e.g., as specified by a standard). Accordingly, no standalone SSS configuration is provided.

At S1120, the standalone SSSs are transmitted from the BS 120 to the UE 110. In some embodiments, the standalone SSSs can be cell specific. Thus, the standalone SSSs can be shared among a plurality of UEs attached or connected to the cell. In some embodiments, the standalone SSSs can be UE specific, and is configured to the UE 110.

At S1130, based on the standalone SSSs, various processes can be performed by the UE 110 based on the standalone SSSs.

In some embodiments, an SSS based RRM measurement can be performed based on the standalone SSSs. When the standalone SSSs are transmitted over a cell or BWP where no SS block is transmitted, the RRM measurement can be performed using standalone SSSs. In contrast, when standalone SSSs are configured to be appended or prepended to SS blocks, the RRM measurement can be performed using both SSSs in the SS blocks and standalone SSSs. The additional SSSs attached to an SS block can improve RRM measurement performance compared with RRM measurement using only the SS block.

For example, the RRM measurement may be used to monitor signal quality of component carriers in scenarios where carrier aggregation is used. The RRM measurement may be used to monitor neighboring cell/beam quality for mobility management and beam management when the UE 110 in RRC connected mode, RRC inactive mode, or RRC idle mode.

With the standalone SSSs available for SSS RRM measurement, transmission of addition CSI-RSs can be avoided. As a result, one set of hardware can be used to handle both RRM measurement over standalone SSSs and RRM measurement over SSSs of a combined signal including an SS block and standalone SSSs. In contrast, when CSI-RSs are used, two sets of hardware may have to be activated: one for processing RRM measurement over SS blocks, the other for processing RRM measurement over CSI-RSs.

In some embodiments, pre-sync can be performed based on the standalone SSSs. For example, when a standalone SSS is appended or prepended to an SS block to form a combined signal, the pre-sync can be performed based on the combined signal for data reception in RRC idle mode (e.g., paging reception) or RRC connected mode. The combined signal provides more OFDM symbols than an SS block, which enables better channel estimation in high mobility scenarios. Similarly, in scenarios the standalone SSSs are transmitted over cells where no SS block is transmitted, a group of consecutively transmitted standalone SSSs in an SSS set can be employed for pre-sync in RRC idle mode or RRC connected mode.

In some examples, TRSs may be used in RRC connected mode for pre-sync in high mobility scenario. However, TRSs cannot be provided in RRC idle mode. Performing pre-sync based on the standalone SSSs, or standalone SSSs in combination with SS blocks, can solve the problem.

In some embodiments, cell search is performed based on the standalone SSSs. For example, cell search can be performed based on a combination of an SS block and a standalone SSS attached to the SS block. The attached standalone SSS provides a diversity gain for decoding SSSs. The standalone SSS prepended to the SS block can be employed to perform an AGC tuning before detecting the SS block, thus providing a protect for decoding PSS in the SS block.

At S1140, RRM measurement results are provided from the UE 110 to the BS 120. This step is performed when the SSS based RRM measurement is performed at the S1130. The process 1100 may terminate after S1140.

Figure 12:
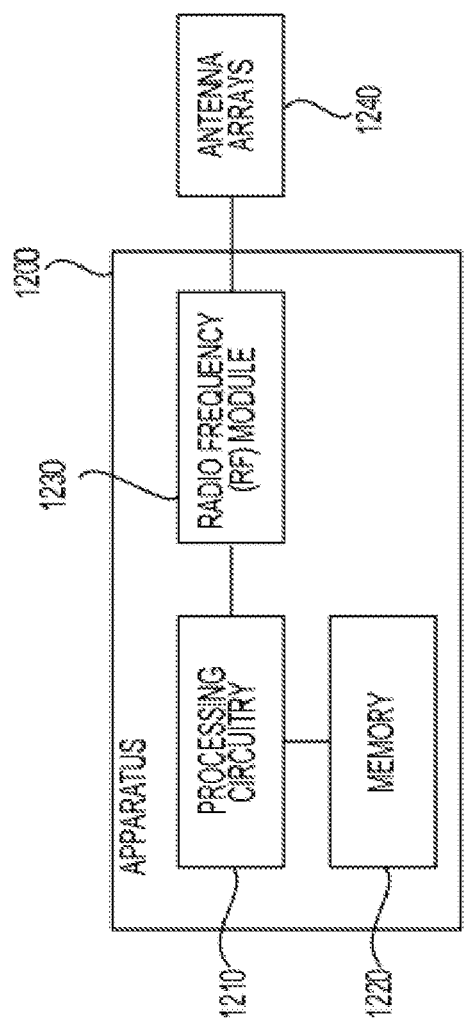
FIG. 12 shows an exemplary apparatus 1200 according to embodiments of the disclosure.

FIG. 12 shows an exemplary apparatus 1200 according to embodiments of the disclosure. The apparatus 1200 can be configured to perform various functions in accordance with one or more embodiments or examples described herein. Thus, the apparatus 1200 can provide means for implementation of techniques, processes, functions, components, systems described herein. For example, the apparatus 1200 can be used to implement functions of the UE 110 or the BS 120 in various embodiments and examples described herein. The apparatus 1200 can include a general purpose processor or specially designed circuits to implement various functions, components, or processes described herein in various embodiments. The apparatus 1200 can include processing circuitry 1210, a memory 1220, and a radio frequency (RF) module 1230.

In various examples, the processing circuitry 1210 can include circuitry configured to perform the functions and processes described herein in combination with software or without software. In various examples, the processing circuitry 1210 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1210 can be a central processing unit (CPU) configured to execute program instructions to perform various functions and processes described herein. Accordingly, the memory 1220 can be configured to store program instructions. The processing circuitry 1210, when executing the program instructions, can perform the functions and processes. The memory 1220 can further store other programs or data, such as operating systems, application programs, and the like. The memory 1220 can include non-transitory storage media, such as a read only memory (ROM), a random access memory (RAM), a flash memory, a solid state memory, a hard disk drive, an optical disk drive, and the like.

In an embodiment, the RF module 1230 receives a processed data signal from the processing circuitry 1210 and converts the data signal to beamforming wireless signals that are then transmitted via antenna arrays 1240, or vice versa. The RF module 1230 can include a digital to analog convertor (DAC), an analog to digital converter (ADC), a frequency up convertor, a frequency down converter, filters and amplifiers for reception and transmission operations. The RF module 1230 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1240 can include one or more antenna arrays.

The apparatus 1200 can optionally include other components, such as input and output devices, additional or signal processing circuitry, and the like. Accordingly, the apparatus 1200 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
  receiving a configuration of a secondary synchronization signal (SSS) burst at a user equipment (UE) from a base station in a wireless communication network, the SSS burst including standalone SSSs grouped into SSS sets, each SSS set associated with a beam index, timings of the SSS sets in the SSS burst following a same pattern as that of synchronization signal (SS) blocks in an SS block burst set, each of the SS blocks in the SS block burst set including a primary synchronization signal (PSS), a SSS, and a PBCH, each of the SSS sets corresponding to a respective one of the SS blocks in the SS block burst set and is not part of the respective one of the SS blocks, the configuration indicating frequency and timing locations of the standalone SSSs; and
  performing pre-synchronization, radio resource management (RRM) measurement, or cell detection based on the standalone SSSs in the SSS burst.

2. The method of claim 1, wherein each standalone SSS is the same as the SSS in the respective one of the SS blocks, or a shifted version of the SSS in the respective one of the SS blocks.

3. The method of claim 1, wherein the SS burst is transmitted over a cell where the SS block burst set is transmitted, and
  each SSS set in the SSS burst neighbors one of the SS blocks in the SS block burst set in time domain with or without a gap between each SSS set and the respective one of the SS blocks.

4. The method of claim 3, wherein each SSS set is transmitted at a same frequency location in frequency domain as the respective one of the SS blocks.

5. The method of claim 3, wherein each SSS set is prepended to the respective one of the SS blocks.

6. The method of claim 3, wherein each SSS set is appended to the respective one of the SS blocks.

7. The method of claim 3, wherein the performing includes:
  performing the pre-synchronization based on a combination of one of the SSS sets and one of the SS blocks neighboring the one of the SSS sets in time domain.

8. The method of claim 3, wherein the performing includes:
  performing the RRM measurement based on SSSs in a combination of one of the SSS sets and one of the SS blocks neighboring the one of the SSS sets in time domain.

9. The method of claim 3, wherein the performing includes:
  performing the cell detection based on a combination of one of the SSS sets and one of the SS blocks neighboring the one of the SSS sets in time domain, wherein a cell group number of the cell is determined based on decoding at least two SSSs in the combination of one of the SSS sets and one of the SS blocks neighboring the one of the SSS sets.

10. The method of claim 3, where the performing includes:
  performing automatic gain control (AGC) to tune a receiving circuit based on one of the standalone SSSs prepended to the respective one of the SS blocks; and
  decoding the respective one of the SS blocks to which the one of the standalone SSSs prepended with the tuned receiving circuit.

11. The method of claim 1, wherein each SSS set includes a plurality of standalone SSSs that are transmitted over a set of contiguous orthogonal frequency division multiplexing (OFDM) symbols.

12. The method of claim 1, wherein the SSS sets in the SSS burst are transmitted over contiguous OFDM symbols.

13. The method of claim 1, wherein the performing includes:
  performing the RRM measurement based on the standalone SSSs in the SSS burst.

14. The method of claim 1, wherein the performing includes:
  performing the pre-synchronization based on the standalone SSSs in the SSS burst.

15. The method of claim 1, wherein the configuration indicates:
  a time offset of a starting time of the SS burst with respect to a timing of a carrier or a bandwidth part that carries the SS block burst set, and
  a transmission period of the SS burst.

16. A method, comprising:
  transmitting a configuration of a secondary synchronization signal (SSS) burst to a user equipment (UE) from a base station in a wireless communication network, the SSS burst including standalone SSSs grouped into SSS sets, each SSS set associated with a beam index, timings of the SSS sets in the SSS burst following a same pattern as that of synchronization signal (SS) blocks in an SS block burst set, each of the SS blocks in the SS block burst set including a primary synchronization signal (PSS), a SSS, and a PBCH, each of the SSS sets corresponding to a respective one of the SS blocks in the SS block burst set and is not part of the respective one of the SS blocks, the configuration indicating frequency and timing locations of the standalone SSSs.

17. The method of claim 16, wherein each standalone SSS is the same as the SSS in the respective one of the SS blocks, or a shifted version of the SSS in the respective one of the SS blocks.

18. The method of claim 16, wherein the SS burst is transmitted over a cell where the SS block burst set is transmitted and
  each SSS set in the SSS burst neighbors one of the SS blocks in the SS block burst set in time domain with or without a gap between each SSS set and the respective one of the SS blocks.

19. An apparatus, comprising:
  circuitry configured to
    receive a configuration of a secondary synchronization signal (SSS) burst from a base station in a wireless communication network, the SSS burst including standalone SSSs grouped into SSS sets, each SSS set associated with a beam index, timings of the SSS sets in the SSS burst following a same pattern as that of synchronization signal (SS) blocks in an SS block burst set, each of the SS blocks in the SS block burst set including a primary synchronization signal (PSS), a SSS, and a PBCH, each of the SSS sets corresponding to a respective one of the SS blocks in the SS block burst set and is not part of the respective one of the SS blocks, the configuration indicating frequency and timing locations of the standalone SSSs; and perform pre-synchronization, radio resource management (RRM) measurement, or cell detection based on the standalone SSSs in the SSS burst.

\* \* \* \* \*

UNITED STATES PATENT AND TRADEMARK OFFICE
CERTIFICATE OF CORRECTION

PATENT NO. : 11,356,967 B2  
APPLICATION NO. : 16/964767  
DATED : June 7, 2022  
INVENTOR(S) : Tao Chen et al.

Page 1 of 1

It is certified that error appears in the above-identified patent and that said Letters Patent is hereby corrected as shown below:

On the Title Page

Item (30), the Foreign Application Priority Data has been omitted. Item (30) should read:
-- (30) Foreign Application Priority Data
Aug. 2, 2018 (CN) ............... PCT/CN2018/098323 --

Signed and Sealed this  
Sixth Day of September, 2022

Katherine Kelly Vidal  
*Director of the United States Patent and Trademark Office*